United States Patent
Miekka et al.

Patent Number: 5,155,604
Date of Patent: Oct. 13, 1992

[54] COATED PAPER SHEET EMBOSSED WITH A DIFFRACTION OR HOLOGRAPHIC PATTERN

[75] Inventors: Richard G. Miekka, Sudbury; Thomas D. Bushman, Dover; Arthur W. Taylor, Uxbridge; Tim Parker, Shrewsbury, all of Mass.; Dennis R. Benoit, Woonsocket, R.I.

[73] Assignee: Van Leer Metallized Products (USA) Limited, Mid-Galamorgan, Wales

[21] Appl. No.: 502,537

[22] Filed: Mar. 30, 1990

Related U.S. Application Data

[60] Division of Ser. No. 253,163, Oct. 3, 1988, Pat. No. 4,913,858, which is a continuation-in-part of Ser. No. 234,448, Oct. 19, 1988, abandoned, which is a continuation-in-part of Ser. No. 113,689, Oct. 26, 1987, abandoned, which is a continuation-in-part of Ser. No. 64,039, Jun. 19, 1987, abandoned.

[51] Int. Cl.$^5$ .......................... G02B 5/18; G02B 5/32; B29D 11/00
[52] U.S. Cl. .......................... 359/2; 264/1.3; 264/1.7; 359/1; 359/3; 359/567; 359/572
[58] Field of Search .............. 350/3.61, 3.65, 162.17, 350/162.18; 264/1.3, 1.7, 284, 134; 359/1, 2, 3, 8, 558, 566, 567, 569, 572

[56] References Cited

U.S. PATENT DOCUMENTS

| | | | |
|---|---|---|---|
| 3,218,212 | 11/1965 | Underwood | 156/244.24 |
| 3,887,678 | 3/1975 | Lewicki, Jr. | 264/284 |
| 4,119,361 | 10/1978 | Greenaway | 350/1.1 |
| 4,129,382 | 12/1978 | Greenaway | 356/71 |
| 4,133,710 | 1/1979 | Wartenberg | 156/244.27 |
| 4,184,700 | 1/1980 | Greenaway | 283/6 |
| 4,215,170 | 7/1980 | Oliva | 156/234 |
| 4,225,554 | 9/1980 | Kaplan | 264/236 X |
| 4,317,849 | 3/1982 | Ogura et al. | 427/362 |
| 4,322,450 | 3/1982 | Gray, III et al. | 427/44 |
| 4,370,377 | 1/1983 | Brugmans | 428/327 |
| 4,370,389 | 1/1983 | Ogura et al. | 427/361 |
| 4,427,732 | 1/1984 | Gray, III et al. | 427/172 |
| 4,501,439 | 2/1985 | Antes | 283/94 X |
| 4,556,378 | 12/1985 | Nyfeler et al. | 425/143 |
| 4,717,221 | 1/1988 | McGrew | 350/3.69 X |
| 4,728,377 | 3/1988 | Gallagher | 156/58 |
| 4,758,296 | 7/1988 | McGrew | 264/1.3 X |
| 4,913,504 | 4/1990 | Gallagher | 350/3.6 |
| 4,913,858 | 4/1990 | Miekka et al. | 264/1.3 |
| 4,933,120 | 6/1990 | D'Amato et al. | 264/1.3 |
| 4,984,824 | 1/1991 | Antes et al. | 350/3.61 X |

FOREIGN PATENT DOCUMENTS

| | | |
|---|---|---|
| 1163477 | 3/1984 | Canada . |
| 3744650 | 7/1989 | Fed. Rep. of Germany . |
| 2210512 | 12/1973 | France . |
| 0071615 | 4/1987 | Japan ..................... 264/1.3 |
| 601796 | 5/1948 | United Kingdom . |
| 612982 | 11/1948 | United Kingdom . |

OTHER PUBLICATIONS

Pasquale, J. A., "Embossing and Related Processes" from *Web Processing and Converting Technology and Equipment*, Chapter 23, pp. 490 et seq.

S. F. Mann, "Holographic Advances Open New Dimensions for Converters", *Paper Film and Foil Converter* (Jul. 1986).

"Are Sales Strategists Asleep to the Market-Making Embossed Hologram?", *Papier & Kunststoff Verarbeiter*, 21, No. 10, pp. 10, 12 and 14, Oct. 1986.

Krotz, R., "New Dimension in Merchandising Aids for Paper, Board & Plastic", *Papier-Kunst. Verarb.*, 21, No. 5, pp. 120, 122 and 124, May 1986.

"Holograms: Marketing Opportunity for the Folding Carton Industry", *Folding Carton Ind.*, 16, No. 4, pp. 10, 12 and 14, Jul. 1989.

*Primary Examiner*—Bruce Y. Arnold
*Assistant Examiner*—David R. Parsons
*Attorney, Agent, or Firm*—Young & Thompson

[57] ABSTRACT

A decorative substrate consisting of a paper base sheet coated with a thermoplastic material, involving a novel technique for coating and embossing the substrate. The paper sheeting is supplied with a thermoplastic material, as by coating or extrusion. The coated sheet is heated to adequately soften the coating, such as by use of a heated cylinder, and remote heat sources such as infrared heaters. The softened sheet surface is then decorated using an embossing member, to provide a diffraction pattern or hologram. Use of an embossment pattern of lesser depth than the surface roughness of the sheet before embossing provides attractive decorative patterns.

18 Claims, 5 Drawing Sheets

COATED PAPER SHEET EMBOSSED WITH A DIFFRACTION OR HOLOGRAPHIC PATTERN

This is a divisional of co-pending application Ser. No. 07/253,163 filed on Oct. 3, 1988, now U.S. Pat. No. 4,913,858, which is a continuation in part of U.S. application Ser. No. 07/234,448 filed on Oct. 19, 1988, now abandoned, which is a continuation in part of U.S. application Ser. No. 07/113,689 filed Oct. 26, 1987, now abandoned, which is a continuation in part of U.S. application Ser. No. 07/064,039 filed Jun. 19, 1987, now abandoned.

BACKGROUND

1. Field of the Invention

This invention relates to the decoration of sheeting and more particularly to the decoration of materials such as standard, lightweight, cellulosic sheets. This invention also relates to the embossment of plastic film and more particularly the high speed embossment of such films with holographic patterns.

2. Description of the Prior Art

Cellulosic sheets are normally decorated by imprinting. To achieve special effects, this requires special inks and relatively complex printing procedures. In addition, some decorative effects cannot be realized by imprinting. Complex procedures limit the speed at which decoration can take place.

In addition, it is difficult to achieve shallow or surface embossment for cellulose sheets because of their grainy texture.

There are wide-spread applications for embossed plastic films. One example is provided by plastic films embossed with holographic patterns. These are used in applications where security sensitive items such as holographic labels are used.

A present practice is to emboss the plastic film with holographic patterns at a relatively slow rate of travel, on the order of 25–30 feet per minute. This is done by direct embossing of polyester film before or after metallization. The film is a single-heated, and softened somewhat, in order to accept an embossing pattern. If the film is softened to the point where it readily accepts the pattern there can be significant distortion of the film and consequently of the pattern embossed upon it. This has resulted in the need to emboss at relatively low temperatures, i.e., below the true softening temperature of the film, slow speeds and relatively high pressures. Such films are typically embossed at rates under about 50 feet per minute.

Another procedure involves a large number of rolls disposed in series and preheated before embossment. It is necessary to use a large number of preheated rolls for careful control over the temperature and the accomplishment of embossment without distortion of the plastic film. In order to reach a desired compromise between web speed and temperature, the leader of the plastic film that is to be embossed is fed through a complex series of rolls. The operation is initially started at a slow speed which is programmed to increase to a desired speed consistent with the temperature at which suitable embossment should take place without damaging the underlying plastic film. Not only is this complex but the final speed that is achievable in practice is in the range from about 30–50 feet per minute.

In a further procedure a film of polyvinylchloride is extruded. The film still retains some of its residual heat when the embossment takes place, but this is awkward. If there is too much of a delay between the time of extrusion and the time of embossment, the pattern is relatively poor. Another objection is that an extruder must be tied to an embossing arrangement.

It is accordingly an object of the invention to provide an alternative and simplified technique for the decoration of sheeting. A related object is to achieve special effects without printing. Another related object is to achieve decorative effects that cannot be realized by ordinary imprinting.

It is an object of the invention to facilitate the embossment of plastic film, particularly films that are to have holographic or diffraction pattern images. A related object is to facilitate the production of security sensitive material such as holographic labels.

Another object is to increase the rate at which plastic films can be embossed without significant distortion. A related object is to avoid the need for embossment at relatively low temperatures, slow speeds and relatively high pressures.

A further object of the invention is to eliminate the need for a large number of preheated rolls in order to control film temperature and accomplish the desired embossment without plastic film distortion.

In another object of the invention is to eliminate the need for embossment following extrusion, with the embossment relying upon the residual heat of extrusion in order to form a suitable pattern. A related object is to improve the quality of patterns associated with embossment following extrusion. Another related object is to eliminate the need for operating embossing apparatus in conjunction with an extruder.

A further object of the invention is to realize desired decorative effects for cellulosic sheeting, at high speed, despite the grainy texture.

SUMMARY OF THE INVENTION

In accomplishing the foregoing and related objects the invention provides for embossing the coating of a substrate, such as paper sheeting. The coating is a thermosensitive material such as polyethylene, polystyrene, polyvinyl chloride and like thermoplastics or semicured thermosets ("B" staged) which have discernible thermoplastic properties. The term thermoplastic, as used hereinafter, shall be construed to include such materials.

The paper advantageously is supplied with the coating of thermoplastic material. In the case of polyethylene, the coating is easily applied by extrusion. The thermoplastic coating may typically be applied in a solvent or water base by gravure or reverse roll methods.

When the coated sheet is heated, the outer layer of thermoplastic material becomes softened. To assure proper softening, adequate heating must be employed. This can take the form of a heated cylinder and additional heaters can be disposed away from the sheet surface. Infrared heaters can be used which operate at temperatures on the order of 1000° F. The thermoplastic coating is heated to above its softening temperature before the embossing. The decoration of the softened sheet surface is accomplished with an embossing member, which can take the form of a roll, rollers, belt or platen. The embossing member transfers an embossment pattern, which can be applied to the softened coating on the sheeting substrate. The result is a decorated sheet.

The embossment desirably has a diffraction pattern or hologram in which the depth is less than one micron and typically under 0.5 microns. When the substrate is paper, the coating that is embossed has a surface roughness with a depth, before embossing, greater than about 0.7 micron. It would be expected that with a depth of surface roughness that exceeds the depth of the diffraction pattern, a suitable transfer of the diffraction pattern to the thermoplastic surface could not be achieved, or, if achieved, would at least be distorted in the area where the surface roughness exceeds the diffraction depth of the embossment member, particularly if the coating is heated to above its softening temperature.

In the practice of the invention it has been discovered surprisingly that a desirable diffraction pattern is produced. The reason for this result is not fully understood. In the present invention the softened coating is theorized to flow into the low depth areas of the substrate producing a more uniformly embossed surface. Other decorative effects can be achieved by the invention, for example, a matte background. In such a case, the decorating roller can be sandblasted or otherwise treated to produce a roughened surface, or the coating surface can be made matte prior to the embossing step. Upon completion of the process, with a matte background and a desired image elsewhere, the result is a desired, decorative material. The invention can be used for the application of diffraction gratings and holographic interference patterns by the decorating member. In addition, the coating surface can be metallized.

Another aspect of the invention is to use a substrate which is a heat-resistant plastic film. An aspect of the invention is that it provides a high speed embossable plastic film formed by the heat resistant base film and a thermoplastic coating upon the base film. The thermoplastic coating has a softening temperature below that of the heat resistant film. This provides a film which is embossable with distortion resistance at relatively high speeds. The heat resistant plastic can be polyethylene terephthalate and the thermoplastic coating illustratively is polyvinylchloride. An embossing pattern in holographic form can be formed on the thermoplastic layer which desirably contains a release agent such as hydroxylated polysiloxane.

In accordance with another apsect of the invention, the thermoplastic coating can be opaque or tinted to provide a lustrous embossing pattern. This gives the appearance of metallization. A side of the thermoplastic coating opposite embossment can be metallized directly or indirectly.

In accordance with a procedure for the high speed embossment of plastic film, a first step is to provide a heat resistant plastic film with a thermoplastic coating that has a softening temperature below the heat-distortion temperature of the heat resistant film. The thermoplastic is then heated to above its softening temperature and the softened thermoplastic layer is contacted with an embossing master.

The contacting step involves the contact of the thermoplastic layer with an embossing master, which is an embossing roller, a metallic die, or a metallized plastic film, on the roller. The master can be used to form a holographic or diffractive pattern in the thermoplastic layer.

In a high-speed embossable sheeting pursuant to the invention, the thermoplastic surface is adapted for diffraction embossment with a release agent preferably of hydroxylated polysiloxane blended within the thermoplastic. The sheeting may include an embossing pattern in the thermoplastic surface, which can be holographic. When the thermoplastic is opaque or tinted, the result is a lustrous embossing pattern. Where the thermoplastic is transparent, it can have a side opposite the embossing pattern which is metallized.

In a method of high-speed embossing of a thermoplastic surface coated on a paper, or heat-resistant plastic substrate, a thermoplastic surface containing a polysiloxane release agent is provided. The thermoplastic surface is heated to above its softening temperature; and the softened thermoplastic surface is contacted with an embossing master at temperatures below the thermoplastic softening temperature. The presence of the release agent facilitates the release of the embossing master during embossing.

The thermoplastic can have opposed surfaces of which the surface facing away from a film is embossed and the surface facing toward the film is metallized. This provides an embossed metallizable member which is producible at relatively high speeds. The embossed thermoplastic can be imprinted with a compatible material to selectively eliminate the embossing pattern at prescribed print positions. The embossed thermoplastic surface can also be directly metallized. The process and embodiments of the invention make practicable high-speed embossing of sheeting.

DETAILED DESCRIPTION

Figure 1:
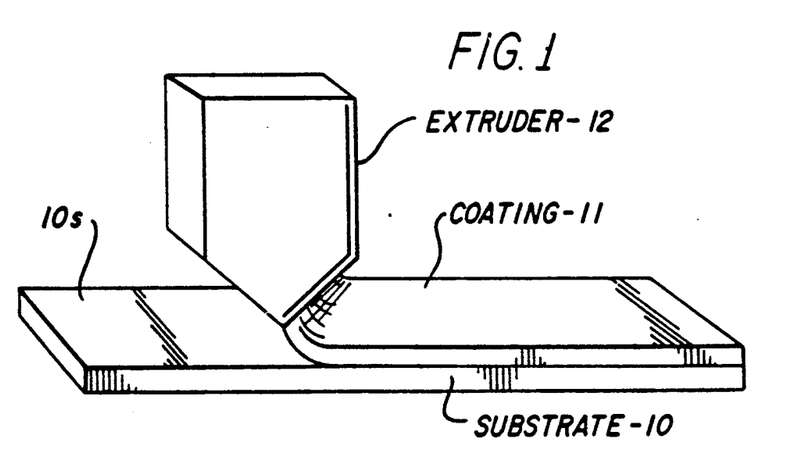
FIG. 1 is a schematic drawing which shows extrusion coating.

Standard paper sheeting 10 is provided with a thermoplastic coating 11, for example, from an extrusion coater 120 (FIG. 1). A typical coating is of polyethylene. The thermoplastic coating 11 may also be applied in a solvent, or water base, using gravure or reverse roll methods.

Paper sheeting 10 thickness usually varies from about 40 microns to about 100 microns. The paper sheeting 10 can also be of cardboard stock having a thickness up to about 750 microns. (Note: 25.4 microns equal 0.001 inch). The thermoplastic coating 11 thickness advantageously is between about 1.5 microns to about 50 microns and can even be higher. The preferred range for the thermoplastic coating 11 thickness has been determined to be about 4 to 10 microns. This corresponds to a coating basis weight, e.g., of polyethylene, of between about 2 to 6 lbs. per 3,000 sq. ft. of coating applied.

Figure 2:
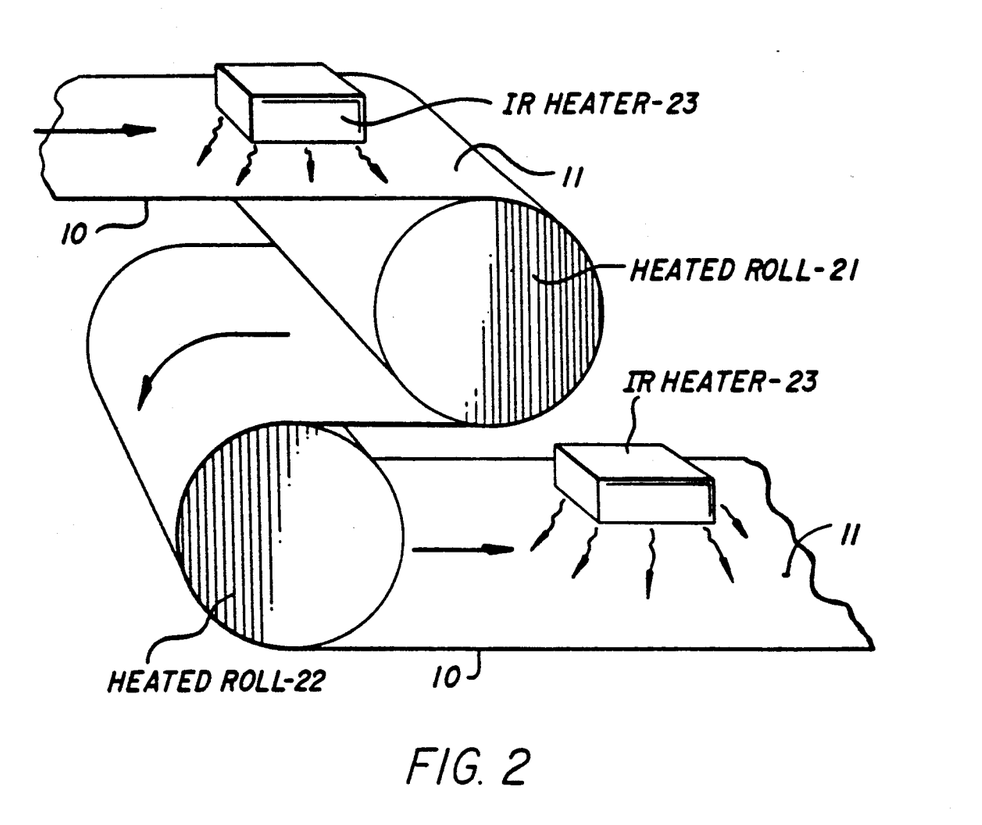
FIG. 2 is a schematic which shows heating of the coated substrate of FIG. 1.

Once the coating 11 is applied to the surface 10s of the paper substrate 10, the coated substrate is applied to a heated cylinder 21 (FIG. 2). This causes the substrate to become heated and to provide thermal transfer through the substrate to the upper outer layer of the plastic material 11.

To assure proper softening, additional heating can be employed (FIG. 2). Particularly suitable is infrared heater 23 which can be disposed away from the surface 11 that is being softened. Such a heater 23 is operated at heater surface temperatures of about 1000° F. In addition, a second heated roll 22 may be employed.

The thermoplastic (thermally deformable) coating 11 just prior to embossing should be heated to well above its softening temperature. A practical limit to heating coating 11, however, is about 450° F. above which temperature paper begins to degrade. In operation, it has been determined that coating 11 should be heated to temperature typically between about 250° F. to 350° F., which range represents a preferred range for most thermoplastic coatings to be embossed in the process of the present invention.

Figure 3:
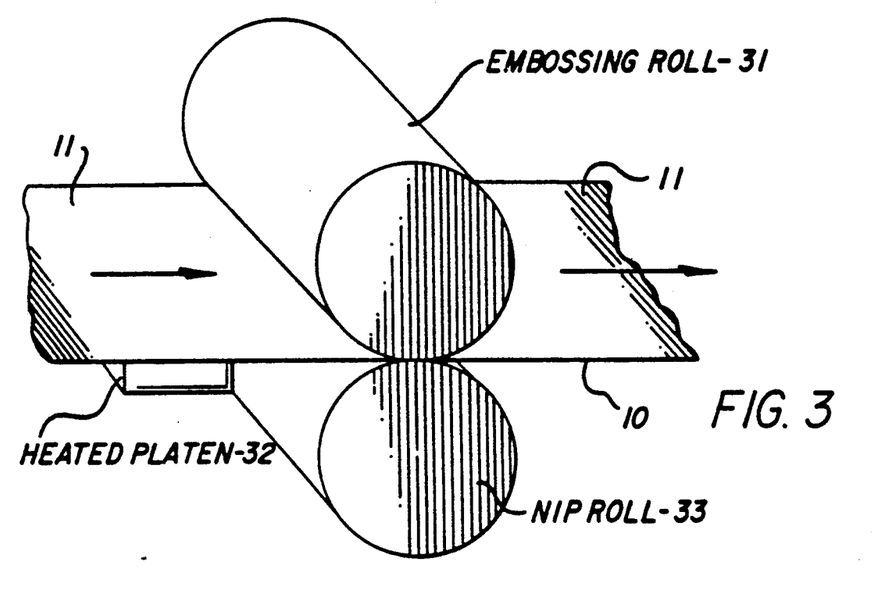
FIG. 3 is a perspective illustration of one form of embossment.
Figure 4:
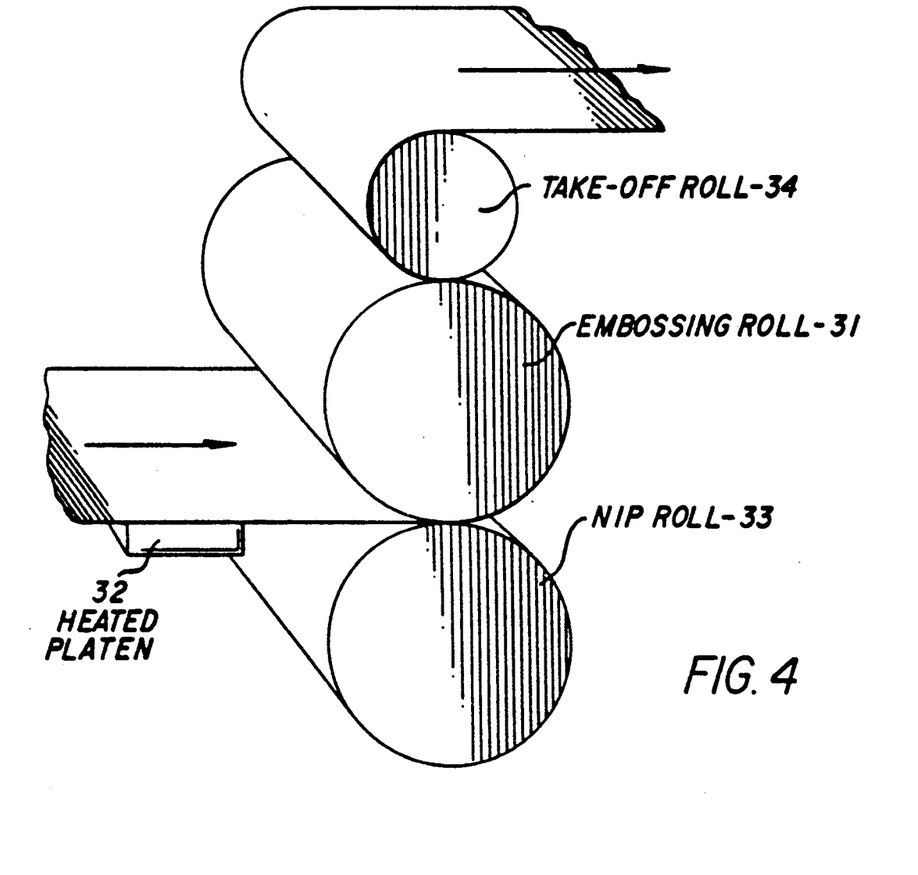
FIG. 4 is a perspective illustration of an alternative form of embossment.

Once the outer layer 11 of plastic, such as polyethylene, has been softened, an embossing arrangement is employed for decoration (FIG. 3 or FIG. 4). In FIG. 3 the arrangement uses a heated platen 32, an embossing roll 31 and a pressure nip roll 33. The embossing roller 31 is a conventional embossing master which has the desired embossing pattern. This pattern is produced on the roller or rollers by engraving, embossing with a hard material or mounting patterned plastic films or metal films onto the surface of the roller. When the embossing roller 31 contacts the softened plastic surface 11, it transfers an embossment pattern to the coating 11 on the paper and simultaneously cools the coating so that it will not flow after being removed from the embossing roller. Thus, in the case of polyethylene, an embossed pattern becomes embedded in the polyethylene surface. The result is decorated, polycoated paper.

The temperature of the embossing master (embossing roller 31) must be below the softening temperature of thermoplastic coating 11. The temperature of embossing roller 31, however, should not be so low as to harden coating 11 before the embossing is completed. It has been found that the preferred temperature for embossing roller 31 (embossing master) can vary depending on its thermal conductivity and specific heat, the embossing nip pressure, operating speed and the temperature to which coating 11 is heated immediately prior to contact with the embossing roller 31. Despite the large number of variables, applicant has determined that the embossing master (roller 31) preferred temperature in the process of the present invention is between about 20° F. to about 60° F. below the self-adhesive temperature of the thermoplastic coating 11. The self-adhesive temperature of the thermoplastic coating 11 is defined as the minimum temperature at which two layers of the coating (excluding any release agents added to the coating) will mutually adhere when pressed together. It has been determined that, in the context of the present process, this generally places the preferred embossing master (embossing roller 31) temperature between about 100° F. and 200° F.

In FIG. 4, a take-off roller 34 has been added to allow longer contact of the embossed surface with embossing roll 31. The longer contact time allows better cooling of the embossed surface to facilitate easy parting of the web from the embossing roll and to prevent possible reflow of the coating and loss of the embossed pattern. The pressure nip roller 33 may be metal or be surfaced with a resilient material such as rubber. The force applied between the pressure nip roller 33 and the embossing roller 31 should range from about 50 pounds per lineal inch (PLI) to about 1000 PLI along the length of contact between these two rollers. The force applied between pressure nip roller 33 and embossing roller 31 may advantageously be 50 to 300 pounds per lineal inch but is more preferably in a range between about 100 to 500 pounds per lineal inch.

This latter range corresponds approximately to between about 400 to 2,000 pounds per square inch. (Contact pressure between two cylinders, or rollers, is often reported in pounds per lineal inch (PLI) rather than pounds per square inch because the exact width (i.e., area) of contact between two rollers is not usually known, but the force applied and contact length are generally known.)

The surface of the embossing master (roller 31) should be hard and distortion resistant so the embossing pattern is preserved during the embossing step. The opposing roller, i.e., nip roller 33, should be firm but also be somewhat resilient. This allows nip roller 33 to apply a nearly uniformly distributed pressure to the back of the sheeting being embossed. It has been determined that nip roller 33 can be quite firm, typically with a Shore A durometer hardness (ASTM D-412) reading of about 40 to about 60, or even somewhat higher, and yet not be so hard as to interfere with attainment of a uniformly distributed pressure on the back of the sheeting being embossed. The contact (dwell) time, wherein the embossing roller 31 and nip roller 33 contact the sheeting or plastic film to achieve embossing, is generally in the range of about 40 milliseconds (e.g., 60 ft./min. for a ½ inch wide contact area) to about 1 millisecond (e.g., 600 ft./min. for a ⅛ inch wide contact area).

The process of the present invention permits embossing of the sheeting herein described at high rates, typically higher than 100 ft./min. The process of the present invention permits embossing of the sheeting herein described at rates typically between 100 ft./min. to 800 ft./min., more typically between about 200 ft./min. to about 500 ft./min.

Various effects can be achieved. If the diffraction pattern is not to be continuous, a matte background can be provided by suitable modification of the embossing roller. Alternatively, the embossing pattern can, in parts, be filled in with coating material, such as ink or clear lacquer, in those areas where no embossed decoration is desired.

Figure 5A:
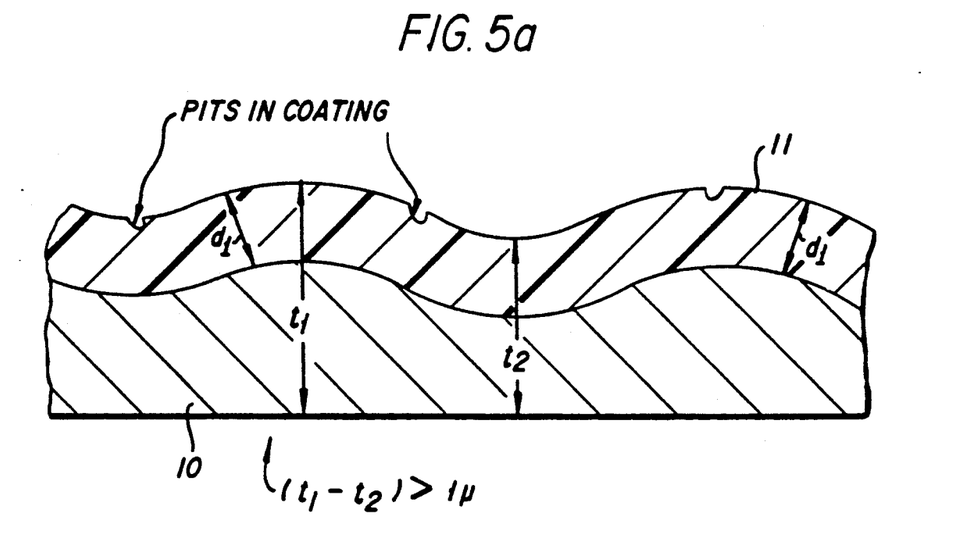
FIG. 5a is a cross section of the laminate showing the surface roughness of the thermoplastic layer.
Figure 5B:
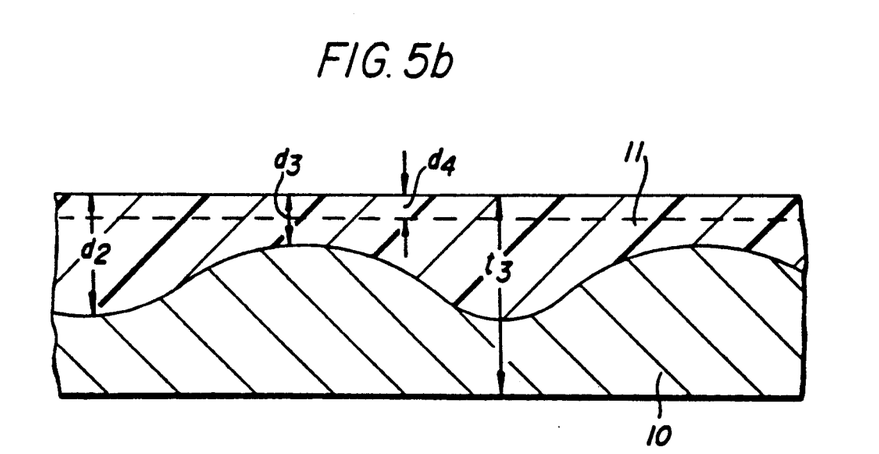
FIG. 5b is a cross section of the laminate after embossing.

FIG. 5A shows an enlargement of the substrate 10 which is paper sheeting with coating II prior to embossing. The substrate 10 has a roughened surface which creates in the structure, a variable thickness ranging between a maximum thickness $t_1$, and a minimum thickness $t_2$. The coating has a uniform depth $d_1$. After embossing, as shown in FIG. 5B, the thickness, $t_3$, is nearly uniform, but the coating depth now varies from $d_2$ to $d_3$ due to the calendaring effect. The embossing pattern depth $d_4$ is less than the original surface roughness $(t_1 - t_2)$.

The surface roughness of the base paper 10, that is, the average peak-to-valley surface height variation, will typically vary from about 1.0 to about 3.0 microns for clay-coated papers suitable for coating. However, rougher paper sheets 10 may also be used. For example, sheets 10 having surface peak-to-valley roughness of up to 5.0 microns, or even higher may also be used, particularly if the thermoplastic coating 11 is applied at high solids content as by extrusion or hot-melt methods.

After the thermoplastic coating 11 is applied, but before embossing, the surface roughness ($t_1 - t_2$) will typically be somewhat lower than the surface roughness of the base paper 10 alone. It has been determined that the surface roughness ($t_1 - t_2$), after the base coating 11 has been applied, may typically be about 70 to 90 percent of the original base paper roughness. Thus the surface roughness ($t_1 - t_2$), after coating 11 has been applied, may typically be between about 0.7 microns to about 3.0 microns and as high as about 5.0 microns. After embossing, the embossing depth illustrated schematically in FIG. 5b is less than the original coated-surface roughness ($t_1 - t_2$). The embossing pattern depth $d_4$ will be less than 1.0 micron and may vary typically from about 0.1 micron to about 0.5 micron more usually between about 0.2 to about 0.4 micron.

Figure 6:
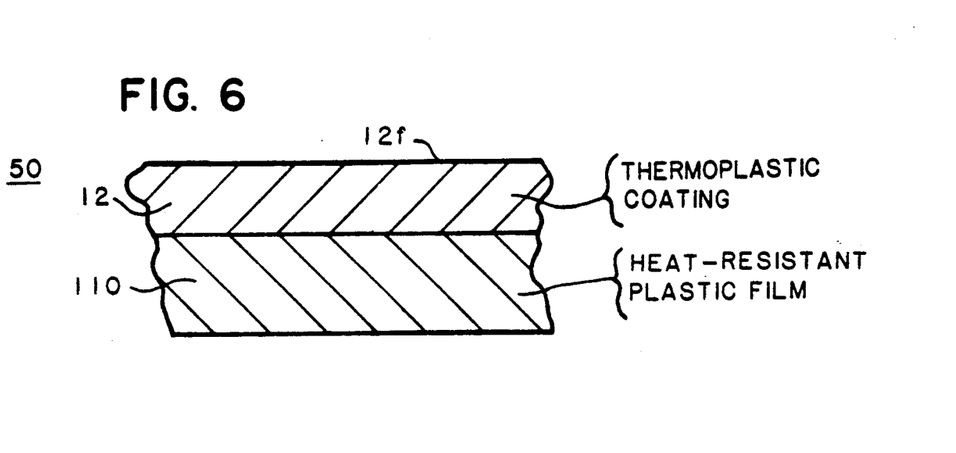
FIG. 6 is a sectional view of a portion of a plastic film composite which is embossable at relatively high speeds in accordance with the invention.
Figure 7:
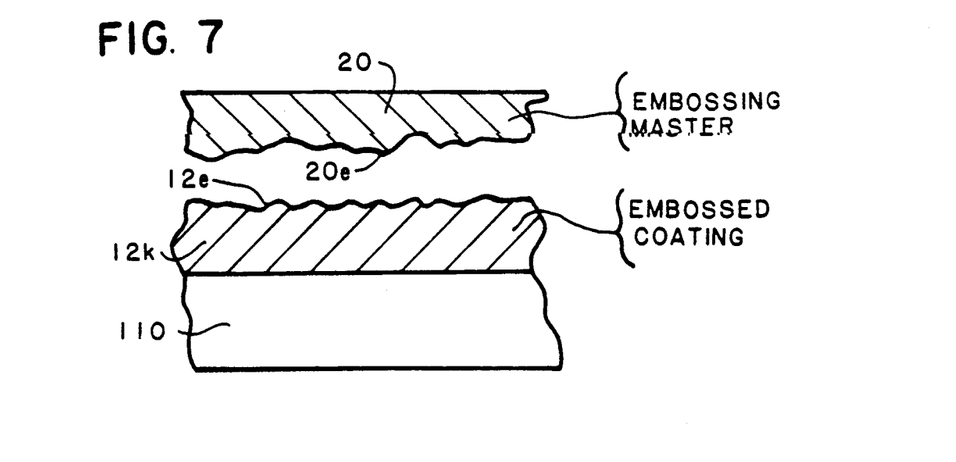
FIG. 7 shows the composite of FIG. 6 after having been embossed by an embossing master.

With reference to the drawings, FIG. 6 illustrates a composite film which is embossable at speeds exceeding 400 feet per minute with good results. The composite film 50 of FIG. 6 is formed by a heat resistant plastic film 110 and an overlying thermoplastic coating 12 containing a release agent. The thermoplastic coating has an outer surface or a face 12f which can receive an embossment as shown in FIG. 7. When a heat-resistant plastic film 110 is used as the substrate, as in FIG. 6, instead of, or in the absence of a paper substrate, the surface of the thermoplastic coating 12 thereon may be smooth. In this case, the depth of the embossment may be greater than the depth of surface roughness of thermoplastic coating 12.

The thermoplastic coating 12 has a softening temperature which is less than the softening temperature of the heat-resistant plastic film 110. All the process conditions aforementioned with respect to the embossing of thermoplastic coating 11 on paper sheeting 10 apply equally to the embossing of the composite plastic film 50 as shown in FIGS. 6 to 10. However, in the case of composite plastic film 50, the coating 12 should soften at least 10° F. and, preferably 40° F. and even more below the heat distortion temperature of the support film, namely, heat-resistant plastic film 110. The composite plastic film 50 should be preheated before embossing to a temperature above the softening temperature of thermoplastic coating 12, which temperature is also below the heat distortion temperature of the heat-resistant plastic film 110. Thus, thermoplastic composite plastic film 50 should be preheated to a temperature before embossing, which is between the softening temperature of coating 12 and the heat distortion temperature of heat-resistant plastic film 110. All other process conditions described with respect to the coated paper sheeting 10 as referenced in FIGS. 1-4 apply as well to the composite plastic film 50 and variations thereof illustrated in FIGS. 6-10.

In FIG. 7 an embossing master 20 is shown after having been applied to the thermoplastic coating 12k and separated to yield an embossed surface 12e. The composite formed by the film 110 at the coating 12k can be embossed at a relatively rapid rate by the embossing master 20. The embossing master 20 may take the form of a pattern stamped embossing roller 31 or rotary metallic die or a metallized film covering roller 31.

Figure 8:
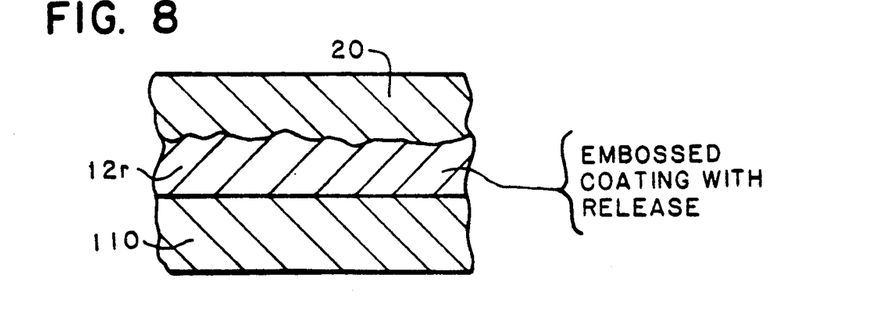
FIG. 8 illustrates embossment of the composite of FIG. 6 where the embossed thermoplastic layer contains a release material to prevent the thermoplastic from sticking to the embossing master.

In order to avoid any tendency for the thermoplastic coating 12 of FIG. 6 to stick to the embossing master 20 of FIG. 7, the thermoplastic coating is provided with a release agent to yield the modified coating 12r illustrated in FIG. 8. The presence of the release agent allows higher speeds to be achieved during embossment. Although other release additives are possible, a preferred release additive for the thermoplastic coating is a polysiloxane preferably hydroxylated polysiloxane. One form of such a polysiloxane is available from the Dow Corning Corporation under the designation Q4-3667. This material has the following chemical formula:

In addition to providing release properties from an embossing master, the material permits the subsequent application of additional coatings, which may be functional or decorative, to the embossed surface without interfering with the adhesion of these coatings. These coatings include vacuum deposited metal and solvent or aqueous borne coatings applied by conventional coating methods.

The release material in conjunction with the embossment procedure herein described is advantageously applied to any situation where a high temperature carrier or a temperature resistant carrier is used in conjunction with a lower temperature plastic coating. It is desirable to maintain a suitable temperature differential between the plastic coating 12 and the embossing master 20. The embossing master 20 temperature should be below the softening temperature of the coating so that rapid embossing takes place and reflow of the plastic is avoided after separation of the coating.

Figure 9:
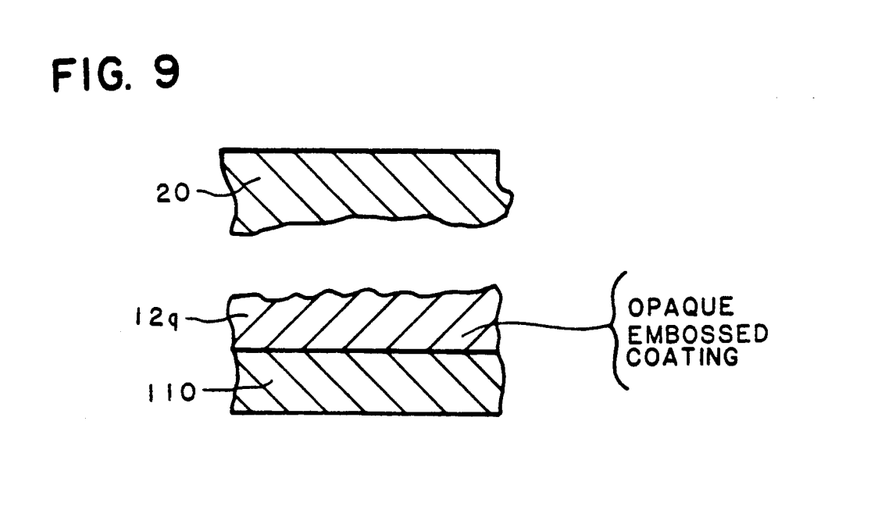
FIG. 9 illustrates a composite employing an opaque coating which has been embossed by a master to produce a lustrous, metallic-like embossment, without metallization.
Figure 10:
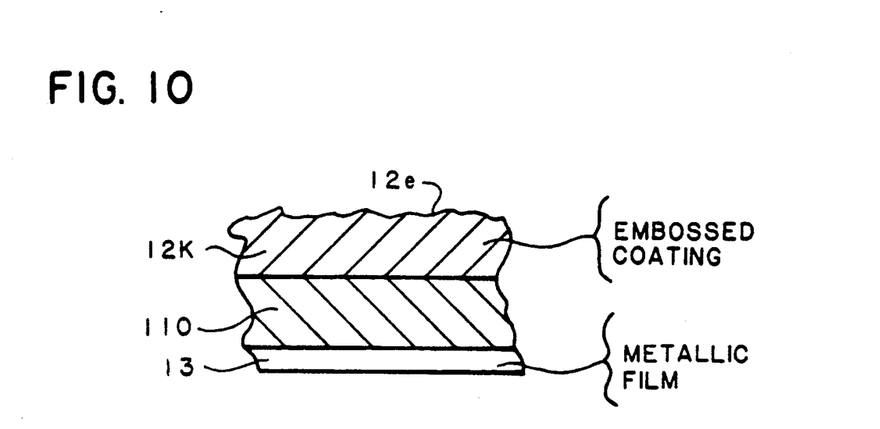
FIG. 10 is a composite in accordance with the invention where metallization has taken place on a surface opposed to an embossed thermoplastic surface.

Other procedures are illustrated in FIGS. 9 and 10. In FIG. 9 solid opaque or tinted colors can be embossed directly to give the luster and effect of metallization without actual metallization. This involves the use of opaque dyes or pigments to produce a brilliant diffraction pattern without metallization. Although in FIG. 9 the embossing master 20 is depressed into the coating 12q, it is also possible to cast the coating 12q on the master 20.

Another embodiment is shown in FIG. 10 where a metallized surface 13 has a clear overcoat structure, which is illustratively formed by the heat-resistant film 110 and the coating 12k. The coating 12k is diffraction embossed. This gives the appearance that is substantially similar to that which is achieved by embossing followed by metallization. A variation of the embodiment shown in FIG. 10 is to have the metallic layer 13 sandwiched between heat-resistant film 110 and thermoplastic coating 12k. A paper substrate could optionally be included under heat-resistant film 110, i.e., film 110 would be first coated onto the paper substrate. This variation also produces the appearance similar to that achieved by embossing followed by metallization. The advantage of such embodiments is that the embossment can take place in line with printing. The metallization step can be performed before the embossment, and it is not necessary to perform it after the embossment. In addition, when the embossing pattern is in the coating, it is possible to control the pattern at will by simply overcoating in accordance with a desired pattern that has the same, or nearly the same, refractive index as the embossed coating because the overcoated areas then are now devoid of the embossment. This permits control over the embossing pattern in a very simply way without requiring a change in the basic embossment that is used with metallic films.

EXAMPLE 1

Solvent Borne Coating

A coating is made consisting of 200 parts by weight of polystyrene in a suitable solvent such as toluene. To this polystyrene solution 1 part by weight of polysiloxane is added and dispersed. This coating is applied by conventional coating methods, such as rotogravure, to a cellulose substrate and dried using forced hot air until all toluene is removed from the coating resulting in a continuous film of polystyrene on the cellulose substrate. Desired coat weight is 2.0–4.0 lbs. of dried polystyrene per 3,000 square feet of cellulose substrate. Embossment can take place immediately after drying while the coating remains hot or can be achieved by subsequent re-heating and embossment of the coating on the cellulose substrate.

EXAMPLE 2

Water Borne Coating

A mixture of 200 parts by weight of a styrenated acrylic emulsion and 1 part by weight of polysiloxane is made. This coating is applied to a cellulose substrate by conventional coating techniques, such as roll coating, and dried using forced hot air or other means to raise the temperature of the liquid to remove all water until a continuous film of the coating on the cellulose substrate is achieved. Desired coat weight is 2.0–5.0 lbs. of dried coating per 3,000 square feet of cellulose substrate. Embossment can occur immediately after drying while the coating is hot or can be achieved by subsequent re-heating and embossment of the coating.

Other aspects of the invention will be apparent to those of ordinary skill in the art. The invention therefore is not intended to be limited to the preferred embodiments described herein but rather is defined by the claims and equivalents thereof.

What is claimed is:

1. Decorative embossed sheeting comprising:
   a paper substrate;
   a metallized layer upon said paper substrate; and
   a transparent thermoplastic coating upon said metallized layer, wherein said transparent thermoplastic coating at its side facing away from the paper substrate is embossed with a diffraction or holographic pattern the depth of which is less than the surface roughness of the paper substrate before embossment, and wherein the embossed pattern was produced on the thermoplastic coating by heating the coating to a temperature above its softening point and contacting the coating with an embossing member maintained at a temperature below the softening temperature of the coating.

2. Sheeting as in claim 1 further comprising a release agent in said thermoplastic coating to increase resistance to sticking of an embossing member at high speeds of embossment.

3. Sheeting as in claim 2 wherein the release agent is a polysiloxane.

4. Sheeting as in claim 3 wherein the release agent is a hydroxylated polysiloxane.

5. Sheeting as defined in claim 1 wherein said transparent thermoplastic coating is comprised of a material selected from the group consisting of polyethylene, polyvinylchloride, styrene acrylate, styrene butandiene, polyvinylacetate, polystyrene, and styrene.

6. Decorate embossed sheeting comprising:
   a paper substrate;
   a thermoplastic coating upon said paper substrate, wherein said thermoplastic coating is embossed with a diffraction or holographic pattern the depth of which is less than the surface roughness of the paper substrate before embossment, and wherein the embossed pattern was produced on the thermoplastic coating by heating the coating to a temperature above its softening point and contacting the coating with an embossing roller maintained at a temperature below the softening temperature of the coating; and
   a hydroxylated polysiloxane release agent in said thermoplastic coating, to increase resistance to sticking at relatively high embossing speeds.

7. Sheeting as defined in claim 6 wherein said thermoplastic is comprised of a material selected from the group consisting of polyethylene, polyvinylchloride, styrene acrylate, styrene butadiene, polyvinylacetate, styrene and polystyrene.

8. Sheeting as defined in claim 6 wherein said thermoplastic is opaque or tinted;
   thereby to provide a lustrous embossed pattern.

9. Sheeting as defined in claim 6 wherein said thermoplastic coating is transparent and said sheeting further comprises a metallized layer between said paper substrate and said transparent thermoplastic coating.

10. Sheeting as in claim 6 wherein the depth of the surface roughness of the thermoplastic coating before embossing is greater than 0.7 microns and the depth of the embossment is between 0.1 and 0.5 microns.

11. Sheeting as in claim 6 wherein the embossed pattern is at least in part filled in with ink or lacquer coating material.

12. Decorative embossed sheeting comprising:
    a paper substrate;
    a thermoplastic coating upon said paper substrate, wherein said thermoplastic coating is embossed with a diffraction or holographic pattern the depth of which is less than the surface roughness of the paper substrate before embossment, and wherein the embossed pattern was produced on the thermoplastic coating by heating the coating to a temperature above its softening point, and contacting the coating with an embossing roller maintained at a temperature below the softening temperature of the coating at an embossing speed of at least 100 feet per minute;
    a release agent in said thermoplastic coating, to increase resistance to sticking at relatively high embossing speeds; and
    a metallized layer over said embossed thermoplastic coating,
    wherein said release agent permits the application of said metallized layer without substantially impairing its adhesion to the thermoplastic coating.

13. Sheeting as defined in claim 12 wherein the release agent comprises a polysiloxane.

14. Sheeting as defined in claim 13 wherein the polysiloxane comprises a hydroxylated polysiloxane.

15. Sheeting as defined in claim 12 wherein said thermoplastic is comprised of a material selected from the group consisting of polyethylene, polyvinylchloride, styrene acrylate, styrene butandiene, polyvinylacetate, styrene and polystyrene.

16. Sheeting as defined in claim 12 wherein said thermoplastic is opaque or tinted;
thereby to provide a lustrous embossed pattern.

17. Sheeting as in claim 12 wherein the depth of the surface roughness of the thermoplastic coating before embossing is greater than 0.7 microns and the depth of the embossment is between 0.1 and 0.5 microns.

18. Decorative embossed sheeting comprising:
a paper substrate;
a thermoplastic coating upon said paper substrate, wherein said thermoplastic coating is embossed with a diffraction or holographic pattern the depth of which is less than the surface roughness of the paper substrate before embossment, and wherein the embossed pattern was produced on the thermoplastic coating by heating the coating to a temperature above its softening point, and contacting the coating with an embossing roller having a patterned plastic film at its surface, said embossing roll being maintained at a temperature below the softening temperature of the coating and being operated at an embossing speed of greater than 100 feet per minute; and
a release agent in said thermoplastic coating, to increase resistance to sticking to said patterned plastic film at relatively high embossing speeds.

* * * * *